(12) United States Patent
Osawa

(10) Patent No.: US 7,500,088 B2
(45) Date of Patent: Mar. 3, 2009

(54) METHODS AND APPARATUS FOR UPDATING OF A BRANCH HISTORY TABLE

(75) Inventor: Masaki Osawa, Tokyo (JP)

(73) Assignee: Sony Computer Entertainment Inc. (JP)

( * ) Notice: Subject to any disclaimer, the term of this patent is extended or adjusted under 35 U.S.C. 154(b) by 606 days.

(21) Appl. No.: 10/886,723

(22) Filed: Jul. 8, 2004

(65) Prior Publication Data

US 2006/0010311 A1    Jan. 12, 2006

(51) Int. Cl.
*G06F 7/38* (2006.01)
*G06F 9/00* (2006.01)
*G06F 9/44* (2006.01)
*G06F 15/00* (2006.01)

(52) U.S. Cl. .................. 712/240; 712/205; 712/206; 712/237

(58) Field of Classification Search .................. 712/240
See application file for complete search history.

(56) References Cited

U.S. PATENT DOCUMENTS 5,434,985 A * 7/1995 Emma et al. ............... 712/240
2005/0066324 A1   3/2005 Delgado et al.

FOREIGN PATENT DOCUMENTS

| JP | 59-002148 | 1/1984 |
|---|---|---|
| JP | 61-145645 | 7/1986 |
| JP | 03-212734 | 9/1991 |
| JP | 05-158689 | 6/1993 |
| JP | 10-333908 | 12/1998 |
| JP | 2002-358289 | 12/2002 |
| KR | 2001-0105384 | 11/2001 |
| KR | 10-2005-0029705 | 3/2005 |
| WO | WO-PCT/US00/06834 | 9/2000 |

OTHER PUBLICATIONS

International Search Report.

* cited by examiner

*Primary Examiner*—Niketa I Patel
*Assistant Examiner*—Jesse R Moll
(74) *Attorney, Agent, or Firm*—Lerner, David, Littenberg, Krumholz & Mentlik, LLP

(57) ABSTRACT

Methods and apparatus are provided for enhanced instruction handling in processing environments. If branch misprediction occurs during instruction processing, a branch history table may be updated based upon the number of instructions to be fetched. The branch history table may be updated in accordance with a first mode if at least two instructions are available, and may be updated in accordance with a second mode if less than two instructions are available. A compiler can assist the processing by aligning instructions for processing. The instructions can be aligned across multiple instruction fetch groups so that instructions are available for fetching and the branch history table is updated prior to performing a branching operation.

31 Claims, 11 Drawing Sheets

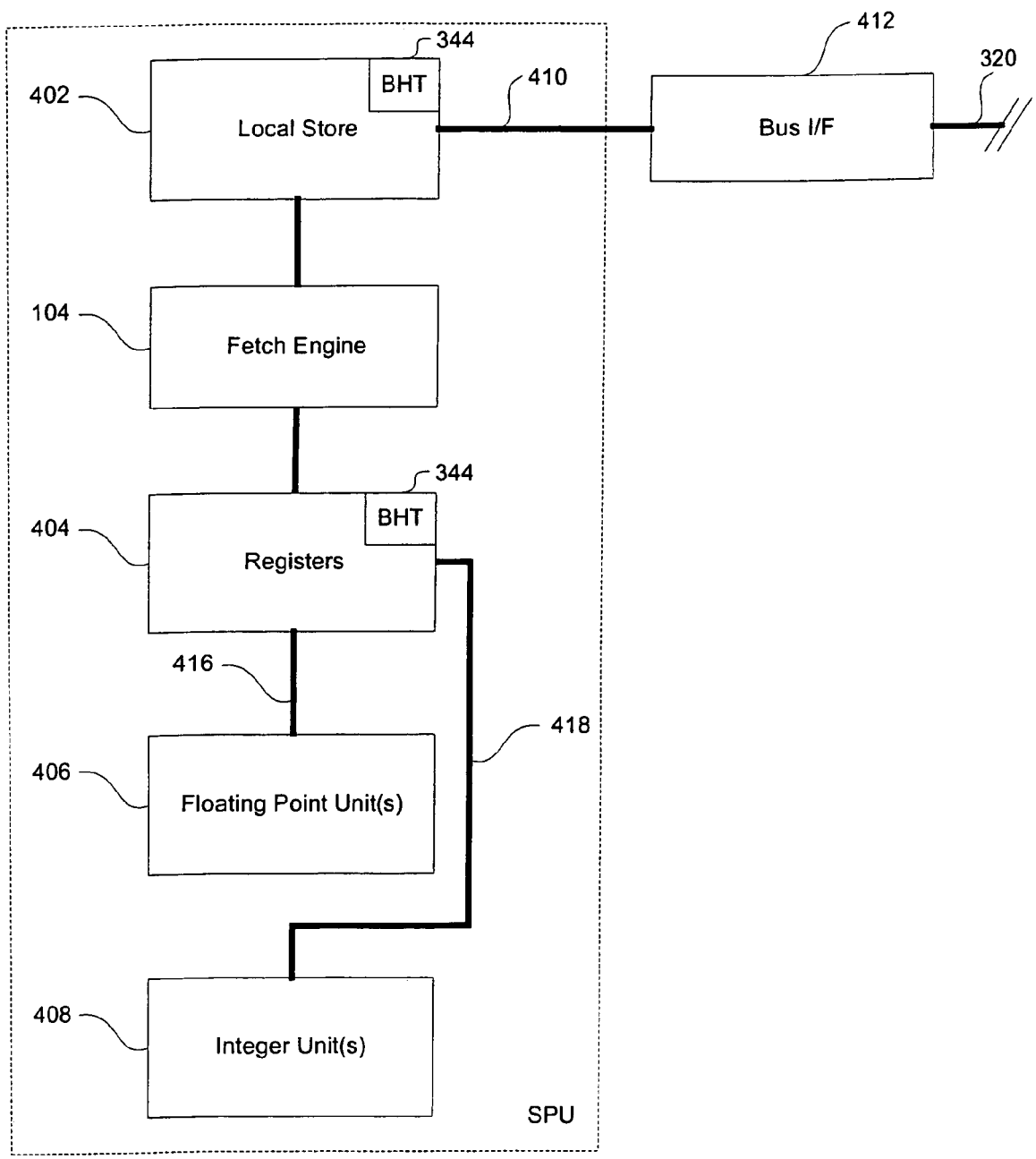

FIG. 7        700

| R_ADDR | Number of Instructions | BHT Update Mode |
|---|---|---|
| 00 | 4 | Fetch-Update-Fetch |
| 01 | 3 | Fetch-Update-Fetch |
| 10 | 2 | Fetch-Update-Fetch |
| 11 | 1 | Fetch-Fetch-Update |

METHODS AND APPARATUS FOR UPDATING OF A BRANCH HISTORY TABLE

BACKGROUND OF THE INVENTION

The present invention relates generally to the field of computing systems, and methods for improving instruction execution, for example, in updating a branch history table ("BHT") used for predictive branching and improving throughput in pipelined processors.

Computer processors often use fetch engine architectures to speed up the execution of programs. The fetch engine architectures utilize fetch engines, instruction buffers and instruction caches to queue several instructions in a pipeline for future execution while the processor is simultaneously executing another instruction. Thus, when the processor finishes executing an instruction, the next instruction is available and ready for execution. Many modern computing systems utilize a processor having a pipelined architecture to increase instruction throughput.

Pipelining of instructions in an instruction cache may not be effective, however, when it comes to conditional jumps or branches. When a conditional jump is encountered, the next set of instructions to be executed will typically be either the instructions immediately following the conditional jump instruction in sequence, which is currently stored in the instruction cache, or a set of instructions at a different address, which may not be stored in the cache. If the next instruction to be executed is not located at an address within the instruction cache, the processor will be effectively paused (e.g., by executing no operations, commonly referred to as "NOP" instructions) for a number of clock cycles while the necessary instructions are loaded into the instruction cache.

Accordingly, when a conditional branch or jump is made, the processor is likely to have to wait a number of clock cycles while a new set of instructions are retrieved. This branch instruction delay is also known as a "branch penalty." A branch penalty will typically be shorter when branching to an instruction already contained within the cache, and longer when the instruction must be loaded into the cache.

Several methods have been developed in an attempt to minimize the branch penalty. These methods include both hardware and software approaches. Hardware methods have included the development of processor instruction pipeline architectures that attempt to predict whether an upcoming branch in an instruction set will be taken, and pre-fetch or pre-load the necessary instructions into the processor's instruction buffer.

In one pipeline architecture approach, a branch history table ("BHT") is used to predict when a branch may be taken. A BHT may be in the form of a table of bits, wherein each entry corresponds to a branch instruction for the executing program, and each bit represents a single branch or no-branch decision. The contents of the BHT could indicate what happened on the last branch decision, and functions to predict what will happen on the next branch. Some BHT's provide only a single bit for each branch instruction, thus the prediction for each occurrence of the branch instruction corresponds to whatever happened last time. This is also known as 1-bit dynamic prediction. Using 1-bit prediction, if a conditional branch is taken, it is predicted to be taken the next time. Otherwise, if the conditional branch is not taken, it is predicted to not be taken the next time.

A BHT can also be used to perform 2-bit dynamic prediction. In 2-bit dynamic prediction, if a given conditional branch is taken twice in succession, it is predicted to be taken next time. Likewise, if the branch is not taken twice in succession, it is predicted to not be taken the next time. If the branch is both taken once and not taken once in the prior two instances, then the prediction for the next instance is the same as the last time. Generally, if the branch is used for loop, 2-bit dynamic prediction using a BHT is better than 1-bit because the branch is NOT taken only once per loop. A BHT uses a significant amount of processor hardware resources, and may still result in significant branch penalties.

When a BHT predicts branching incorrectly, also known as "branch misdirection," the BHT should be updated. This involves rewriting the bitmap for the particular branch instruction that is being executed in accordance with the particular prediction scheme being used.

Instruction pipelines or instruction caches often use 2-port random access memory ("RAM"), which allows for simultaneous "fetches" (reads) and "updates" (writes), thereby improving processor throughput in general. Processor architectures using 2-port RAM can be expensive, however, both in terms of actual cost and in design time. Using a 2-port RAM simplifies the situation that occurs when a BHT is used and a conditional jump instruction causes a jump to an instruction that is in the instruction cache. In this case, the 2-port RAM permits a new instruction to be fetched at the same time the BHT is updated.

Use of 1-port RAM instead of a 2-port RAM can be preferred because of lower cost and design time. A 1-port RAM, however, does not allow simultaneous fetches (reads) and updates (writes). Use of 1-port RAM has several potential drawbacks, such as reducing processor pipeline throughput as well as the BHT "hit ratio," i.e., the proportion of "correct" branching predictions made due to the BHT. As an example, in the previously mentioned condition, when a BHT is used and a conditional jump instruction causes a jump to an instruction that is within the instruction cache, a problem arises. In this case, the fetching of the next instruction and the updating of the BHT cannot occur at the same time. This can adversely affect processor performance.

Since BHT updating and instruction fetching both require RAM access, it is possible to significantly slow system performance by selection of an incorrect mode of updating the BHT. Such a system slowdown can be particularly severe in the case of 1-port RAM, since updates and fetches cannot be performed simultaneously.

SUMMARY OF THE INVENTION

The present invention addresses these and other drawbacks.

In one embodiment according to the present invention, a method is provided for updating a branch history table to assist in processing branch instructions by a processor that holds a plurality of instructions. The method determined a number of instructions to be fetched. A first mode is selected to update the branch history table when there are at least two instructions to be fetched. A second mode is selected to update the branch history table when there are less than two instructions to be fetched.

In one alternative, if the first mode is selected, the method further includes fetching at least two instructions into the instruction pipeline to be executed, updating the branch history table, and then fetching one or more additional instructions into the instruction pipeline to be executed. If the second mode is selected, the method further includes fetching a first instruction into the instruction pipeline to be executed, fetching another instruction into the instruction pipeline to be executed, and then updating the branch history table. In an example, at least some of the plurality of instructions are stored in a memory, and selected ones of the instructions are fetched from the memory.

In another alternative, determining the number of instructions comprises examining a value associated with an address location of the instructions. In this case, the value can be contained in a register or located at an address in a memory.

The value may be a one-bit binary value. In this case, the method preferably further comprises determining that there is one instruction awaiting execution when the binary value is a first number, and determining that there are two or more instructions awaiting to be execution when the binary value is a second number.

The value may be a two-bit binary value. In this case, the method preferably further comprises determining that there is one instruction awaiting execution when the binary value is a first number, and determining that two or more instructions are awaiting execution when the binary value is not the first number.

The value may also be a binary value having more than two bits. In this case, the method preferably further comprises determining that one instruction can be delivered when the binary value satisfies a first condition, and determining that two or more instructions can be delivered when the binary value satisfies a second condition.

In yet another alternative, the value is an instruction offset associated with a fetch group.

In a further alternative, the method is performed if the branch history table incorrectly predicts whether a branch instruction would or would not be taken.

In another embodiment according to the present invention, a method of operating a processor is provided. The processor employs an instruction cache, a branch history table, and a fetch engine for fetching instructions. The branch history table has a selectable update mode. The method comprises examining a value associated with a current branch redirection address of the fetch engine; determining if at least two of the instructions can be delivered by the fetch engine and selecting a first mode for the branch history table when the value satisfies a first condition; and determining if less than two instructions can be delivered by the fetch engine and selecting a second mode for the branch history table when the value satisfies a second condition.

In one alternative, if the first mode is selected, the method further comprises fetching at least two instructions into the instruction pipeline to be executed, updating the branch history table, and then fetching one or more additional instructions into the instruction pipeline to be executed. If the second mode is selected, the method further comprises fetching a first instruction into the instruction pipeline to be executed, fetching another instruction into the instruction pipeline to be executed, and then updating the branch history table. Preferably, at least some of the instructions may be stored in a memory. In this case, selected instructions may be fetched from the memory.

In yet another embodiment according to the present invention, a processor is provided. The processor includes an instruction pipeline and a branch history table. The branch history table is capable of managing a program containing instructions that can be executed by the processor. If the branch history table incorrectly predicts whether a conditional branch instruction should be taken, a first mode of operation is selected if the instruction pipeline has at least two instructions that can be executed by the processor, and a second mode of operation is selected if the instruction pipeline has less than two instructions that can be executed by the processor.

In one alternative, upon selecting the first mode, the processor fetches at least two instructions into the instruction pipeline to be executed, updates the branch history table, and then fetches one or more additional instructions into the instruction pipeline to be executed. Upon selecting the second mode, the processor fetches a first instruction into the instruction pipeline to be executed, fetches another instruction into the instruction pipeline to be executed, and then updates the branch history table.

In a further embodiment according to the present invention, a recording medium is provided. The recording medium is recorded with a computer program for use by a processor having an instruction pipeline and using a branch history table (BHT) to assist in processing instructions. The BHT has a selectable update mode. The computer program comprises determining the number of instructions in the instruction pipeline that can be executed by the processor; selecting a first mode of operation to fetch at least some of the instructions and update the BHT when there are at least two instructions in the instruction pipeline that can be executed by the processor; and selecting a second mode of operation to fetch at least some of the instructions and update the BHT when there are less than two instructions in the instruction pipeline that can be executed by the processor.

In one alternative, if the first mode is elected, the computer program further comprises fetching at least two instructions into the instruction pipeline to be executed, updating the BHT, and fetching one or more additional instructions into the instruction pipeline to be executed. If the second mode is selected, the computer program further comprises fetching a first instruction into the instruction pipeline to be executed, fetching another instruction into the instruction pipeline to be executed, and then updating the BHT. Preferably, at least some of the instructions are stored in a memory and selected ones of the instructions are fetched from the memory.

In another alternative, determining the number of instructions in the pipeline that can be executed by the processor is performed by examining a binary value.

In a further alternative, the binary value is either a one-bit binary value or a two-bit binary value.

In another embodiment according to the present invention, a compiler is provided. The compiler is for generating object code instructions from computer source code for execution on a processor. The processor employs a fetch engine using fetch groups including the object code instructions. The object code instructions include at least one set of looping instructions having a beginning instruction and a branching instruction. The compiler performing the steps comprising (a) when the looping instructions span first and second fetch groups, aligning the beginning instruction of the set in a position that is not the last instruction in the first fetch group; and (b) when the looping instructions are contained within the first fetch group, aligning the beginning instruction in the first fetch group and the branching instruction in the second fetch group.

In yet another embodiment according to the present invention, a method of updating a branch history table is provided. The method comprises determining a number of instructions ready for delivery to a processor; selecting a first mode for updating the branch history table when the number of determined instructions exceeds a minimum value; selecting a second mode for updating the branch history table when the number of determined instructions does not exceed the minimum value; and updating the branch history table according to the first mode or the second mode.

In one alternative, the first mode is selected if there are at least two instructions for processing by the processor, and the second mode is selected if there are less than two instructions for processing by the processor.

In another alternative, the first mode includes an ordered process of fetching at least two instructions, updating the branch history table, and fetching one or more additional instructions. In this alternative, the second mode includes an ordered process of fetching a first instruction, fetching another instruction, and updating the branch history table.

In yet another embodiment according to the present invention, a method of processing instructions having a loop is provided. The method comprises determining a beginning of a loop iteration of the loop, determining a number of instructions in the loop between the beginning of the loop iteration and a branching instruction, and aligning the loop instructions within at least one fetch group of instructions based on the beginning of the loop iteration and the number of determined instructions so that a branch history table is updated prior to executing the branching instruction.

In one alternative, if the loop instructions are contained within one fetch group, aligning the instructions includes spreading the loop instructions across at least two fetch groups so that the beginning of the loop iteration is in a first one of the fetch groups and the branching instruction is contained within a second one of the fetch groups. In this case, the method preferably further comprises inserting at least one NOP instruction between the beginning of the loop iteration and the branching instruction.

In another alternative, if the loop instructions are contained within two fetch groups, aligning the instructions includes moving the beginning of the loop iteration so that the beginning of the loop iteration is not the last instruction in a first one of the two fetch groups. In this case, the beginning of the loop iteration is preferably moved to the beginning of the first fetch group.

In a further embodiment according to the present invention, a method of processing instructions having a loop is provided. The method comprises determining the beginning of a loop iteration of the loop, determining the number of instructions in the loop iteration between the beginning of the loop iteration and a branching instruction, and aligning the loop instructions within at least two fetch groups based on the beginning of the loop iteration and the number of determined instructions so that a first mode for updating a branch history table is selected. Preferably, the first mode comprises fetching at least two of the loop instructions for execution, then updating the branch history table, and then fetching at least an additional one of the loop instructions for execution.

In another embodiment according to the present invention, a processing system for processing operations is provided. The processing system comprises a plurality of processing devices operable to execute instructions using a branch history table. A first one of the processing devices comprises a processing element, a processing unit or a sub-processing unit. If the branch history table incorrectly predicts whether a conditional branch instruction should be processed, a first mode of operation is selected for execution by the first processing device at least two instructions are available for the first processing device. A second mode is selected for execution by the first processing device if less than two instructions are available for the first processing device.

In one alternative, the first processing device comprises a processing element including the branch history table. The processing element may further include a fetch engine connected to the branch history table. In another alternative, a second one of the processing devices comprises a processing unit that is part of the processing element. In this case, the processing unit preferably includes the branch history table.

Here, the processing unit may further include a fetch engine connected to the branch history table.

In a further alternative, a second one of the processing devices comprises a processing unit that is part of the processing element, and a third one of the processing devices comprises a sub-processing unit that is part of the processing element and is connected to the processing unit by a bus. In this case, the sub-processing unit may include the branch history table. Here, the sub-processing unit may further include a fetch engine connected to the branch history table.

In yet another alternative, a second one of the processing devices comprises a processing unit. The first processing device comprises a first sub-processing unit, and at least a third one of the processing devices comprises a second sub-processing unit. The first and second sub-processing units are connected to the processing unit by a bus. At least the first sub-processing unit is connected to a memory and is operable to execute instructions using the branch history table.

In one example for this alternative, upon selecting the first mode, the first sub-processing unit fetches at least two instructions for execution, updates the branch history table, and then fetches one or more additional instructions for execution. Upon selecting the second mode, the first sub-processing unit fetches a first instruction for execution, fetches another instruction for execution, and then updates the branch history table. In another alternative, the processing system further comprises a memory for storing instructions available to the processing devices. In this case, the memory is preferably integrally provided with the processing devices.

In a further embodiment according to the present invention, a processor for processing operations is provided. The processor comprises a processing element including a bus, a processing unit and a plurality of sub-processing units connected to the processing unit by the bus. The processing element is connected to memory and is operable to execute instructions having a loop. The processing element determines a beginning of a loop iteration of the loop, determines a number of instructions in the loop between the beginning of the loop iteration and a branching instruction, and aligns the loop instructions within at least one fetch group of instructions based on the beginning of the loop iteration and the number of determined instructions so that a branch history table is updated prior to executing the branching instruction.

In an alternative, if the loop instructions are contained within one fetch group, aligning the instructions includes spreading the loop instructions across at least two fetch groups so that the beginning of the loop iteration is in a first one of the fetch groups and the branching instruction is contained within a second one of the fetch groups.

In another alternative, if the loop instructions are contained within two fetch groups, aligning the instructions includes moving the beginning of the loop iteration so that the beginning of the loop iteration is not the last instruction in a first one of the two fetch groups.

"Compiler" as used herein refers generally to any software, firmware and/or hardware used to convert computer source code to machine-readable code. A compiler may include any software, including but not limited to compilers, interpreters, and object linkers. Specifically, the term "compiler" as used herein is not limited to any particular dictionary definition, but is to be broadly construed to include anything that can generate machine object language to be executed on a processor from source code, or cause a processor to run the generated code. For example, any compiler for a programming language, including but not limited to any assembly language, any compiled language, such as "C", "C++", Cobol, Fortran, Ada, Pascal, etc., or any interpretive language, such as BASIC, JAVA, XML, or any other language may be used.

Similarly, "compilation" as used herein includes any and all process steps for generating machine object code and running it on a processor. "Compilation" as used herein is also not limited to any particular dictionary definition.

BRIEF DESCRIPTION OF THE DRAWINGS

FIG. 4B is another diagram illustrating an exemplary structure of an SPU in accordance with aspects of the present invention;

FIG. 7 is an exemplary table depicting the BHT mode selection in accordance with a two-bit implementation embodiment of the present invention.

DETAILED DESCRIPTION OF THE PREFERRED EMBODIMENTS

Figure 1:
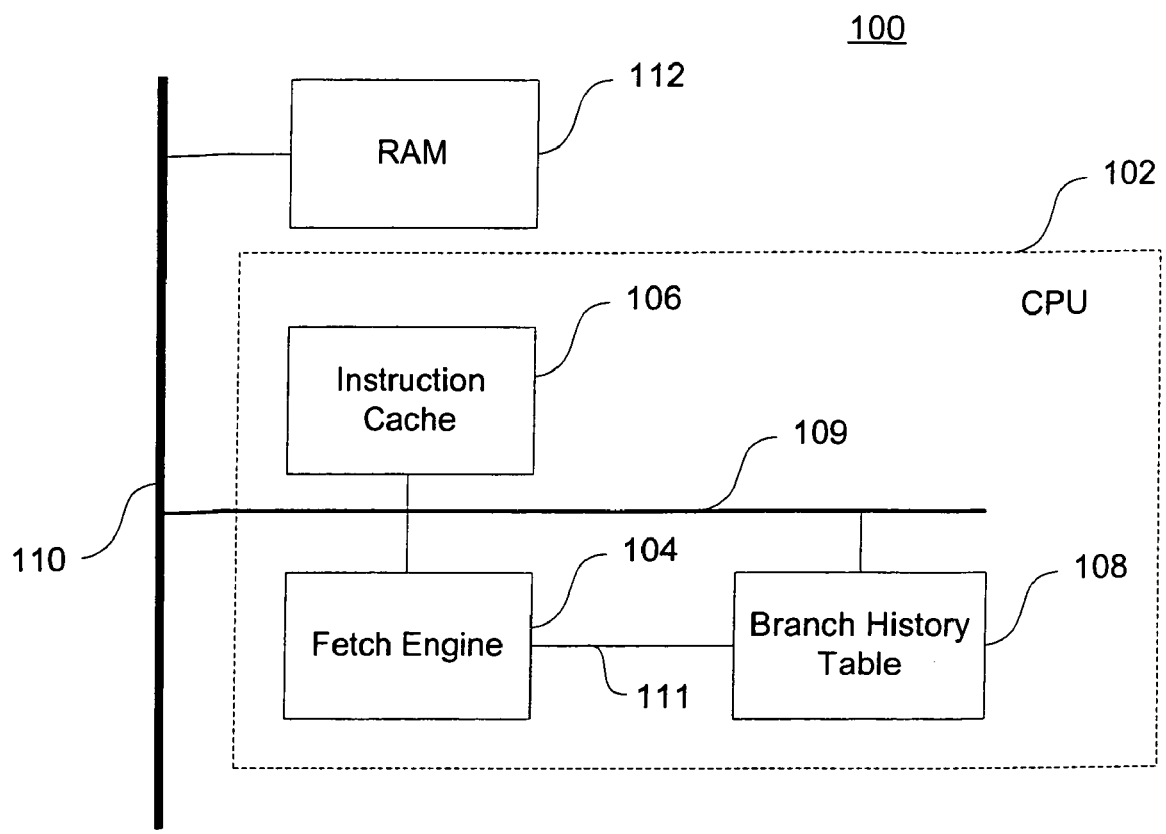
FIG. 1 is a schematic block diagram of a system in accordance with an embodiment of the present invention.

As shown in FIG. 1, a computer system 100 uses a fetch engine architecture to fetch instructions into a pipeline for future execution by a CPU 102. The computer system 100 includes the central processing unit ("CPU") 102, a fetch engine 104, an instruction cache 106, a BHT 108, RAM 112, a CPU bus 109, and a data bus 110. Although only these components are depicted in FIG. 1, it should be appreciated that a typical system 100 can include a large number of components, peripherals, and communications buses. Further, the fetch engine 104 can have a number of different architectures and components, as long as it functions to fill an instruction pipeline with instructions to be executed by a processor. In a preferred embodiment, the computer system 100 is a general purpose computer or gaming machine such as a Sony PLAYSTATION®, having additional internal components normally found in those computer systems such as, for example, a display, a CD-ROM, a hard-drive, input devices such as a mouse, joystick and/or keyboard, speakers, etc. and all of the components used for connecting these elements to one another. These components have not been depicted in FIG. 1 for clarity, but are well known to those skilled in the art. Additionally, the computer system 100 may comprise any workstation, personal digital assistant ("PDA"), or other processor-controlled device or system capable of processing instructions.

The CPU 102 may be a processor of any type. The instruction cache 106, fetch engine 104 and BHT 108 are preferably integrated within the CPU 102, although they may also be implemented as one or more discrete components external to the CPU 102. The CPU 102 may also be part of a multiprocessor system, as will be discussed below.

The instruction cache 106 stores the instructions in the pipeline waiting to be executed by the CPU 102. The instruction cache 106 may also be of any sort and design. For example, the instruction cache 106 can be a 32-kilo word (KW) instruction cache using four word blocks. Alternatively, any size instruction cache 106 using any size blocks may also be used. The instruction cache 106 generally is associated with an instruction buffer, not shown in FIG. 1. The instruction buffer typically holds the next instruction to be executed by the processor 102.

A variety of fetch engine architectures can also be used. For example, the instruction cache 106 can be omitted and only an instruction buffer used. In any event, in accordance with the present invention, it is important to employ an architecture where the fetch engine 104 fetches a number of instructions into a pipeline for future execution by the CPU 102.

As depicted in FIG. 1, a preferred embodiment, the fetch engine 104, the instruction cache 106, and the BHT 108 are interconnected within the CPU 102, for example, via the CPU bus 109. Such packaging advantageously provides close proximity of the fetch engine 104, the instruction cache 106, the BHT 108, the instruction pipeline and the CPU 102, which minimizes power consumption and instruction transfer time. The fetch engine 104 and the BHT 108 are preferably connected via a direct link 111. Alternatively, the instruction cache 106 and the BHT 108 may be separate components, or each or both may be implemented within the RAM 112. The fetch engine 104 comprises the hardware and/or the firmware used by the computer system 100 to manage and move instructions from the RAM 112 into the instruction cache 106 (and the instruction buffer) for eventual execution by the CPU 102. For example, many CPUs have specialized circuitry to manage their associated instruction pipelines and buffers, and many different designs can be used.

In an alternative embodiment of the invention, the instruction cache 106, the fetch engine circuit 104, the BHT 108 and the CPU 102 are each in direct communication with the data bus 110. The data bus 110 facilitates the transfer of instructions and data to and from devices and memory.

Preferably, the instruction cache 106, the data bus 110, the BHT 108, the CPU 102 and the fetch engine circuit 104 are in communication with the system memory, e.g., RAM 112. In certain implementations, the RAM 112 may be embedded in or otherwise integrated as part of the processor chip containing the CPU 102, as opposed to being a separate, external memory. For instance, the RAM 112 can be in a separate location on the chip or can be integrated with the CPU 102. RAM 112 may be 1-port RAM or 2-port RAM, or another architecture. Use of a 1-port RAM with the present invention is preferred since it advantageously allows a reduction of cost, both in expense and time needed for design, as compared with a similar system using a 2-port RAM. Use of a 1-port RAM, however, may include several drawbacks, such as not being able to perform fetches and updates at the same time. This inability to fetch and update at the same time negatively impacts the use of a branch history table. As previously described, the branch history table must be updated every time it does not accurately predict whether a branch instruction is to be taken or not. At the same time, the instruction pipeline may not have the correct instructions for execution by the CPU 102, so that new instructions must be fetched. Not being able to fetch and update at the same time can slow processor performance by reducing the BHT hit ratio and pipeline throughput. The present invention, however, provides for improved performance using either a 1-port or 2-port RAM based system, and thus allows the use of a 1-port RAM to achieve a cost savings.

Figure 2:
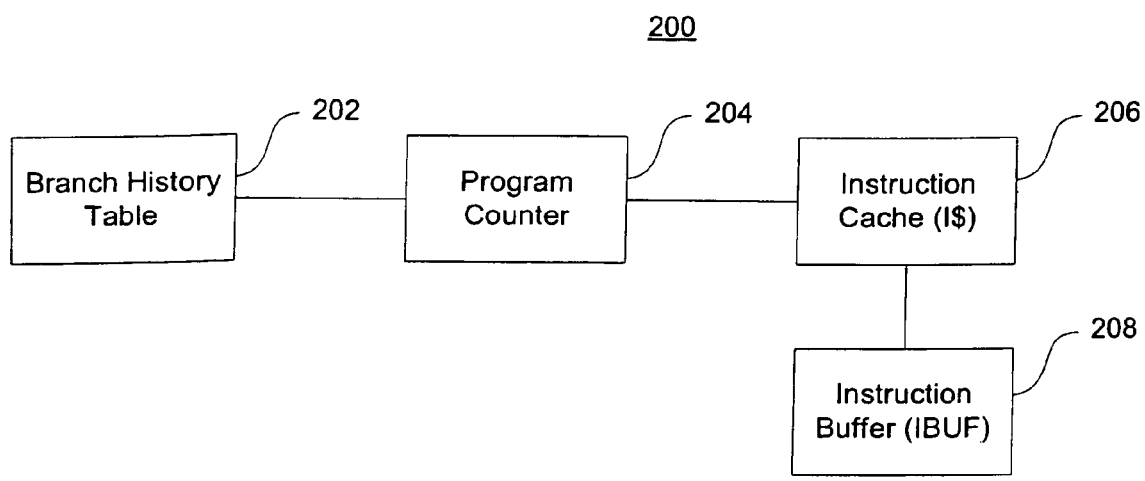
FIG. 2 is a schematic block diagram of a system in accordance with an embodiment of the present invention.

FIG. 2 is a schematic block diagram of a system 200 in accordance with one embodiment of the present invention. Preferably, the CPU (not depicted) executes instructions sequentially.

A BHT 202 is used to keep a preferably 1-bit or 2-bit history of the results of the CPU executing branching instructions, as previously described. A program counter 204 may be used to determine the BHT address for the branch instruction to be executed next. For example, if the program counter 204 currently contains a reference address to a non-branching instruction, the corresponding BHT entry may include the branching history for the next branching instruction. In an alternative embodiment, the BHT 202 may itself incorporate instructions for determining the location within the BHT 202 for the next branching instruction.

Regardless of how determined, the retrieved or fetched branching history is used by the CPU to determine what predicted instructions are to be loaded into the instruction cache 206. A fetching mechanism also referred to herein as a "fetch engine" (e.g., the fetch engine 104), then moves the appropriate group of instructions from the instruction cache 206 to the instruction buffer 208 of the CPU, from where they may be executed.

Typically, a significant amount of hardware and/or software processing may be needed whenever the BHT 202 is accessed and the instruction cache 206 and instruction buffer 208 are updated. Thus, it is advantageous in an embodiment to optimize the fetching and updating of the BHT entries. This is particularly advantageous in the case of 1-port RAM since the limitations in accessing 1-port RAMs may create a bottleneck.

As stated above, the CPU 102 may be part of a multiprocessor system. The instruction cache 106 or 206, and/or the data bus 110 may employ a different architecture in a multiprocessor system than those depicted above, although the present invention is similarly applicable to such systems. Specifically, if system hardware maintains cache coherence, the instruction cache 106 or 206, and/or the data bus 110 should be designed to maintain cache coherence. This is unnecessary for systems that use software to maintain cache coherence.

Figure 3A:
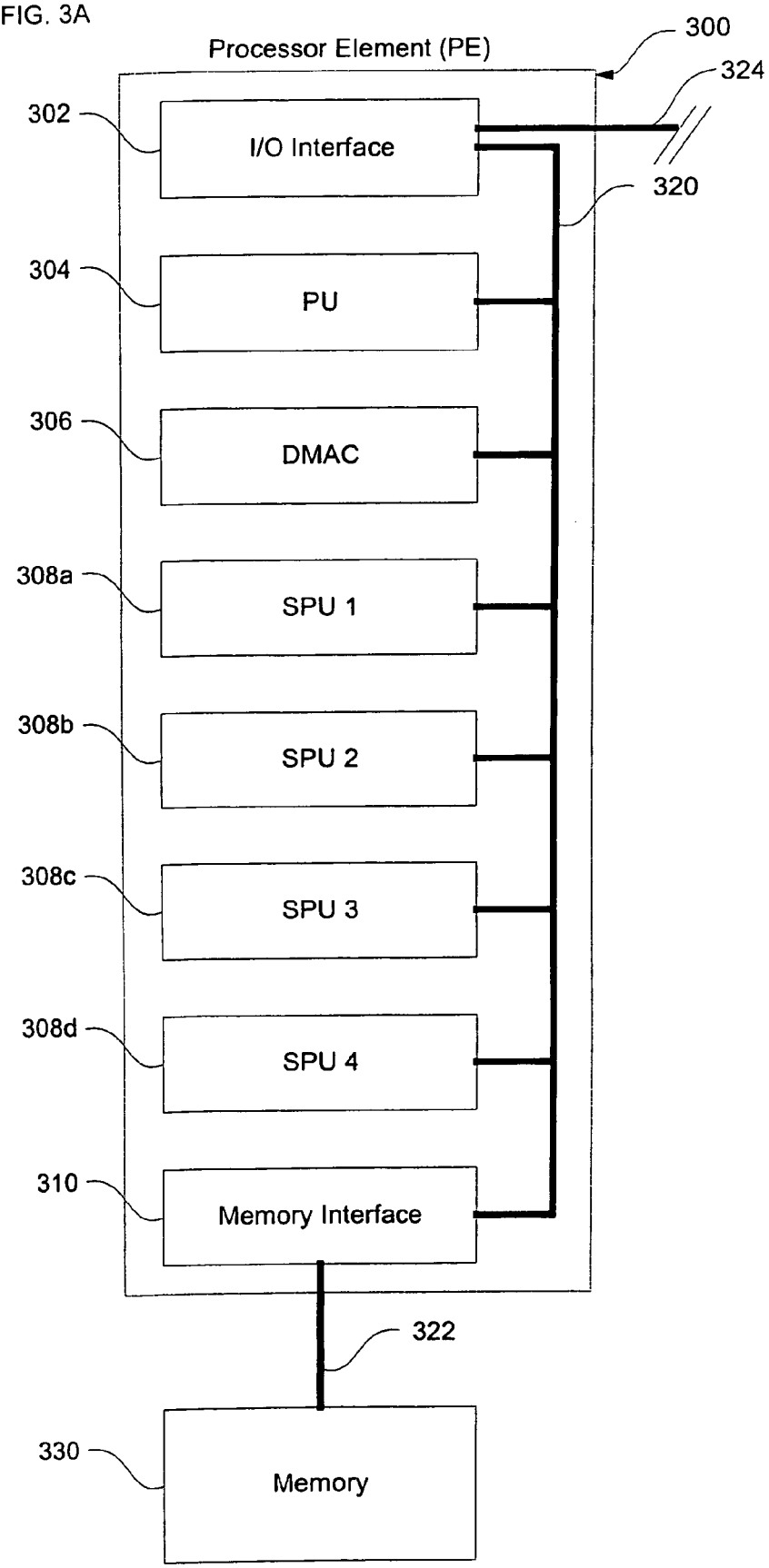
FIG. 3A is a diagram illustrating an exemplary structure of a processing element (PE) in accordance with aspects of the present invention.

Reference is now made to FIG. 3A, which is a block diagram of a basic processing module or processor element (PE) 300 that can be employed in accordance with aspects of the present invention. As shown in this figure, the PE 300 preferably comprises an I/O interface 302, a processing unit (PU) 304, a direct memory access controller (DMAC) 306, and a plurality of sub-processing units (SPUs) 308, namely SPUs 308a-308d. While four SPUs 308a-d are shown, the PE 300 may include any number of such devices. A local (or internal) PE bus 320 transmits data and applications among PU 304, the SPUs 308, I/O interface 302, DMAC 306 and a memory interface 310. Local PE bus 320 can have, e.g., a conventional architecture or can be implemented as a packet switch network. Implementation as a packet switch network, while requiring more hardware, increases available bandwidth. The I/O interface 302 may connect to one or more external I/O devices (not shown), such as frame buffers, disk drives, etc. via an I/O bus 124.

PE 300 can be constructed using various methods for implementing digital logic. PE 300 preferably is constructed, however, as a single integrated circuit employing CMOS on a silicon substrate. PE 300 is closely associated with a memory 330 through a high bandwidth memory connection 322. The memory 330 desirably functions as the main memory (system memory) for PE 300. In certain implementations, the memory 330 may be embedded in or otherwise integrated as part of the processor chip incorporating the PE 300, as opposed to being a separate, external memory. For instance, the memory 330 can be in a separate location on the chip or can be integrated with one or more of the processors that comprise the PE 300. Although the memory 330 is preferably a dynamic random access memory (DRAM), the memory 330 could be implemented using other means, e.g., as a static random access memory (SRAM), a magnetic random access memory (MRAM), an optical memory, a holographic memory, etc. DMAC 306 and memory interface 310 facilitate the transfer of data between the memory 330 and the SPUs 308 and PU 304 of the PE 300.

PU 304 can be, e.g., a standard processor capable of standalone processing of data and applications. In operation, the PU 304 schedules and orchestrates the processing of data and applications by the SPUs 308. In an alternative configuration, the PE 300 may include multiple PUs 304. Each of the PUs 304 may include one, all, or some designated group of the SPUs 308. The SPUs 308 preferably are single instruction, multiple data (SIMD) processors. Under the control of PU 304, the SPUs 308 may perform the processing of the data and applications in a parallel and independent manner. DMAC 306 controls accesses by PU 304 and the SPUs 308 to the data and applications stored in the shared memory 330. Preferably, a number of PEs, such as PE 300, may be joined or packed together, or otherwise logically associated with one another, to provide enhanced processing power.

Figure 3B:
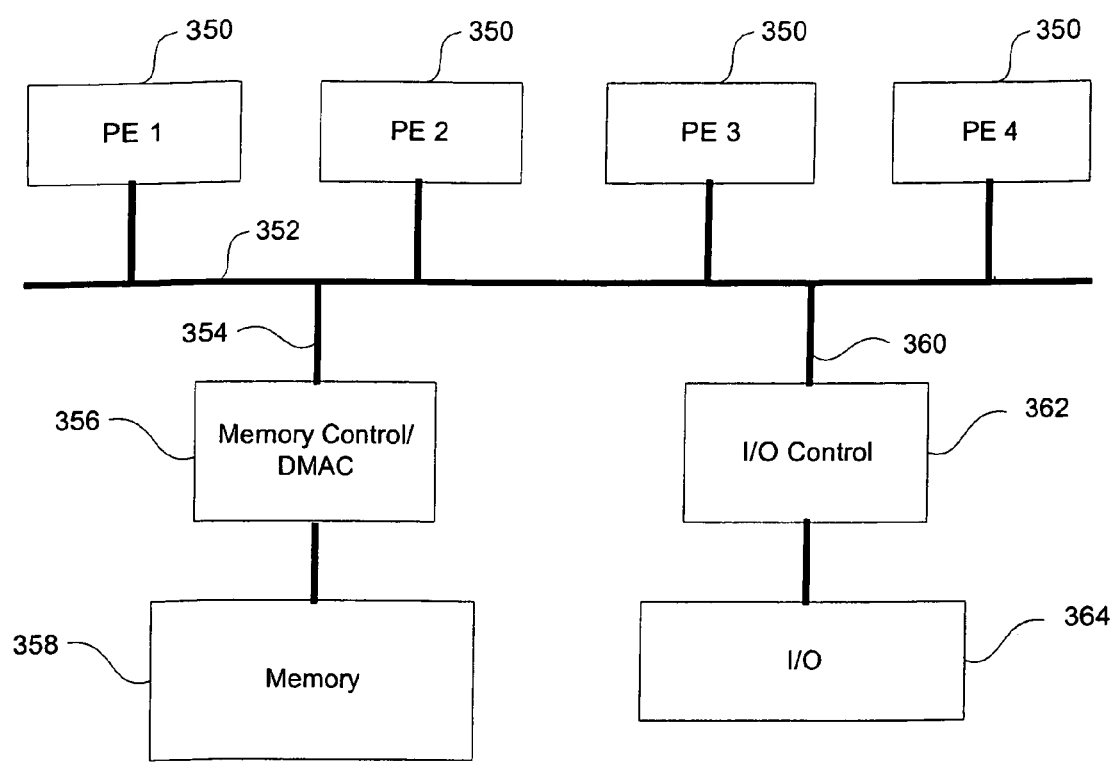
FIG. 3B is a diagram illustrating an exemplary structure of a multiprocessing system of PEs in accordance with aspects of the present invention.

FIG. 3B illustrates a processing architecture comprised of multiple PEs 350 (PE 1, PE 2, PE 3, and PE 4) that can be operated in accordance with aspects of the present invention. Preferably, the PEs 350 are on a single chip. The PEs 350 may or may not include the subsystems such as the PU and/or SPUs discussed above with regard to the PE 300 of FIG. 3A. The PEs 350 may be of the same or different types, depending upon the types of processing required. For example, the PEs 350 may be generic microprocessors, digital signal processors, graphics processors, etc.

The PEs 350 are preferably tied to a shared bus 352. A memory controller or DMAC 356 may be connected to the shared bus 352 through a memory bus 354. The DMAC 356 connects to a memory 358, which may be of one of the types discussed above with regard to memory 330. In certain implementations, the memory 358 may be embedded in or otherwise integrated as part of the processor chip containing one or more of the PEs 350, as opposed to being a separate, external memory. For instance, the memory 358 can be in a separate location on the chip or can be integrated with one or more of the PEs 350. An I/O controller 362 may also be connected to the shared bus 352 through an I/O bus 360. The I/O controller 362 may connect to one or more I/O devices 364, such as frame buffers, disk drives, etc.

It should be understood that the above processing modules and architectures are merely exemplary, and the various aspects of the present invention may be employed with other structures, including, but not limited to multiprocessor systems of the types disclosed in U.S. Pat. No. 6,526,491, entitled "Memory Protection System and Method for Computer Architecture for Broadband Networks," issued on Feb. 25, 2003, and U.S. application Ser. No. 09/816,004, entitled "Computer Architecture and Software Cells for Broadband Networks," filed on Mar. 22, 2001, which are hereby expressly incorporated by reference herein.

Figure 4A:
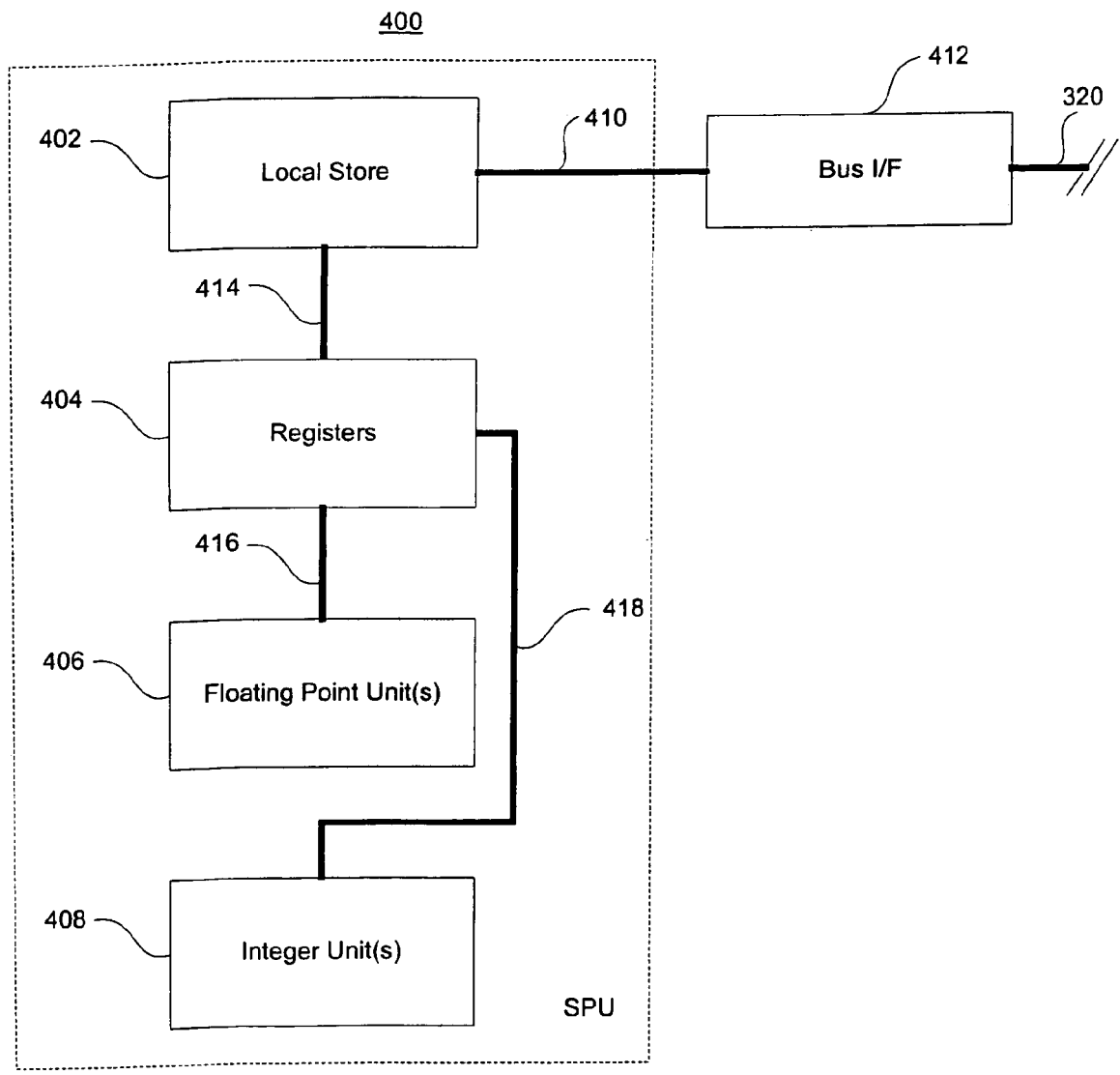
FIG. 4A is a diagram illustrating an exemplary structure of a sub-processing unit (SPU) in accordance with aspects of the present invention.

FIG. 4A illustrates an SPU 400 that can be employed in accordance with aspects of the present invention. One or more SPUs 400 may be integrated in the PE 300. In a case where the PE 300 includes multiple PUs 304 or 400, each of the PUs 304 may control one, all, or some designated group of the SPUs.

SPU 400 preferably includes local store (LS) 402, registers 404, one or more floating point units (FPUs) 406 and one or more integer units (IUs) 408. The components of SPU 400 are, in turn, comprised of subcomponents, as will be described below. Depending upon the processing power required, a greater or lesser number of FPUs 406 and IUs 408 may be employed. In a preferred embodiment, LS 402 contains at least 128 kilobytes of storage, and the capacity of registers 404 is 128×128 bits. FPUs 406 preferably operate at a speed of at least 32 billion floating point operations per second (32 GFLOPS), and IUs 408 preferably operate at a speed of at least 32 billion operations per second (32 GOPS).

LS 402 is preferably not a cache memory. Cache coherency support for the SPU 400 is unnecessary. Instead, the LS 402 is preferably constructed as an SRAM. A PU 304 may require cache coherency support for direct memory access initiated by the PU 304. Cache coherency support is not required, however, for direct memory access initiated by the SPU 400 or for accesses to and from external devices.

SPU 400 further includes bus 410 for transmitting applications and data to and from the SPU 400 through a bus interface (Bus I/F) 412. In a preferred embodiment, bus 410 is 1,024 bits wide. SPU 400 further includes internal busses 414, 416 and 418. In a preferred embodiment, bus 414 has a width of 256 bits and provides communication between LS 402 and registers 404. Busses 416 and 418 provide communications between, respectively, registers 404 and FPUs 406, and registers 404 and IUs 408. In a preferred embodiment, the width of busses 416 and 418 from registers 404 to the FPUs 406 or IUs 408 is 384 bits, and the width of the busses 416 and 418 from the FPUs 406 or IUs 408 to the registers 404 is 128 bits. The larger width of the busses from the registers 404 to the FPUs 406 and the IUs 408 accommodates the larger data flow from the registers 404 during processing. In one example, a maximum of three words are needed for each calculation. The result of each calculation, however, is normally only one word.

Figure 3C:
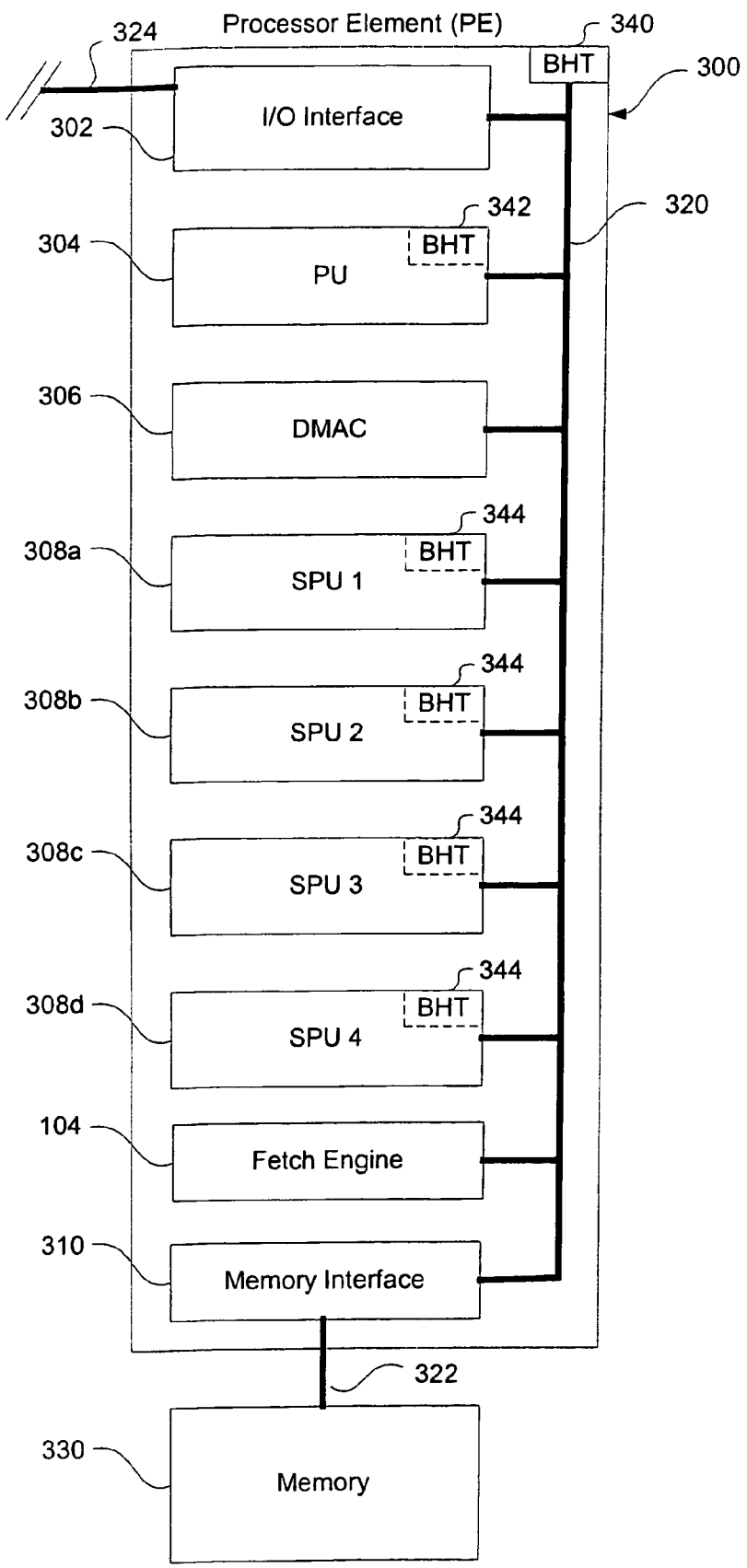
FIG. 3C is a diagram illustrating another exemplary structure of a PE in accordance with aspects of the present invention.

In the multiprocessor system of FIG. 3C, BHT 340 may be implemented as part of the PE 300 or 350. The BHT may be implemented as BHT 342, which is part of the PU 304. The BHT may also be implemented as one or more BHTs 344, which are part of the SPU 308 or 400, or as part of other circuitry in the multiprocessor system. As with the architecture of FIG. 1, the BHT 340, 342 or 344 is desirably implemented in association with the fetch engine 104. Therefore, the BHT and the fetch engine 104 are preferably implemented as part of the same device, e.g., the PE 300, PU 304 or SPU 308. As seen in FIG. 3C, the fetch engine 104 and the BHT 340 are both connected to the local PE bus 320. If the BHT 342 is implemented as part of the PU 304, the fetch engine 104 may also be integrated as part of the PU 304 (not shown). If implemented as part of the SPU 308 or 400, the BHT 344 may be implemented using the LS 402 and/or the registers 404, as seen in FIG. 4B. The fetch engine 104 may be implemented between the LS 402 and the registers 404, or elsewhere in the SPU 308 or 400. The instruction cache 106 may also be implemented in the same device(s) as the BHT 340, 342 or 344 and the fetch engine 104.

In accordance with a preferred aspect of the present invention, a determination as to when to update a BHT to optimize processor performance is made by deducing the number of processor pipelines that can be delivered for execution, and optimizing code execution to align instructions based on this scenario.

In a preferred embodiment, the fetch engine determines how many instructions can be delivered by querying a "branch redirection address," which is a finite number of binary bits, e.g., two bits at a known memory address (the "two-bit" case). The number of instructions to be delivered may be determined by analyzing these bits, which range from one (corresponding to bits '11' in the two-bit case) to four (corresponding to bits '00' in the two-bit case).

Figure 5:
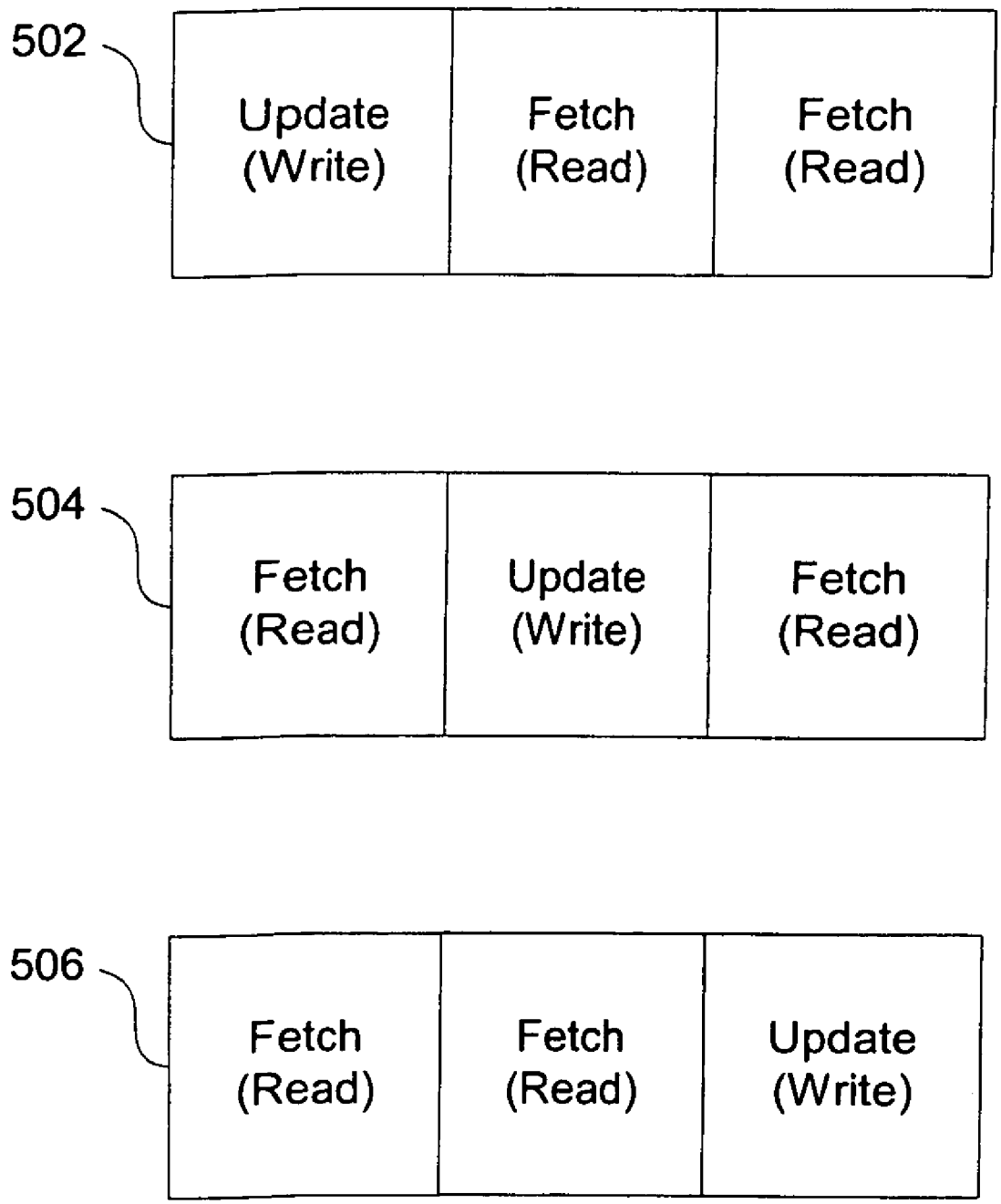
FIG. 5 illustrates the various modes of updating a Branch History Table in accordance with a preferred embodiment of the present invention.

In a preferred embodiment, there are three possible modes of updating the BHT 202 after a branch misdirection. These modes are depicted in FIG. 5 and are referred to as: Update-Fetch-Fetch 502, Fetch-Update-Fetch 504, and Fetch-Fetch-Update 506 modes.

As illustrated in FIG. 5, in the Update-Fetch-Fetch 502 mode, the fetch engine 104 first updates the BHT 108, then two instruction groups are fetched, one after the other. In the Fetch-Update-Fetch 504 mode, the fetch engine 104 first fetches an instruction group, then the BHT 108 is updated and then another instruction group is fetched. In the Fetch-Fetch-Update 506 mode, two instruction groups are fetched and then the BHT 108 is updated. After a branch misdirection, in which the prediction of whether a branch of a branching instruction is taken using the BHT 108 is incorrect, a new instruction group should be fetched or loaded, so the BHT mode preferably is either be Fetch-Update-Fetch 504 or Fetch-Fetch-Update 506.

In accordance with a preferred embodiment of the invention, if the instruction pipeline or the fetch engine 104 delivers two or more instructions, the Fetch-Update-Fetch 504 mode of operation is implemented. Otherwise, if the instruction pipeline or the fetch engine 104 delivers less than two instructions, the Fetch-Fetch-Update mode 506 of operation is preferably implemented.

Figure 6:
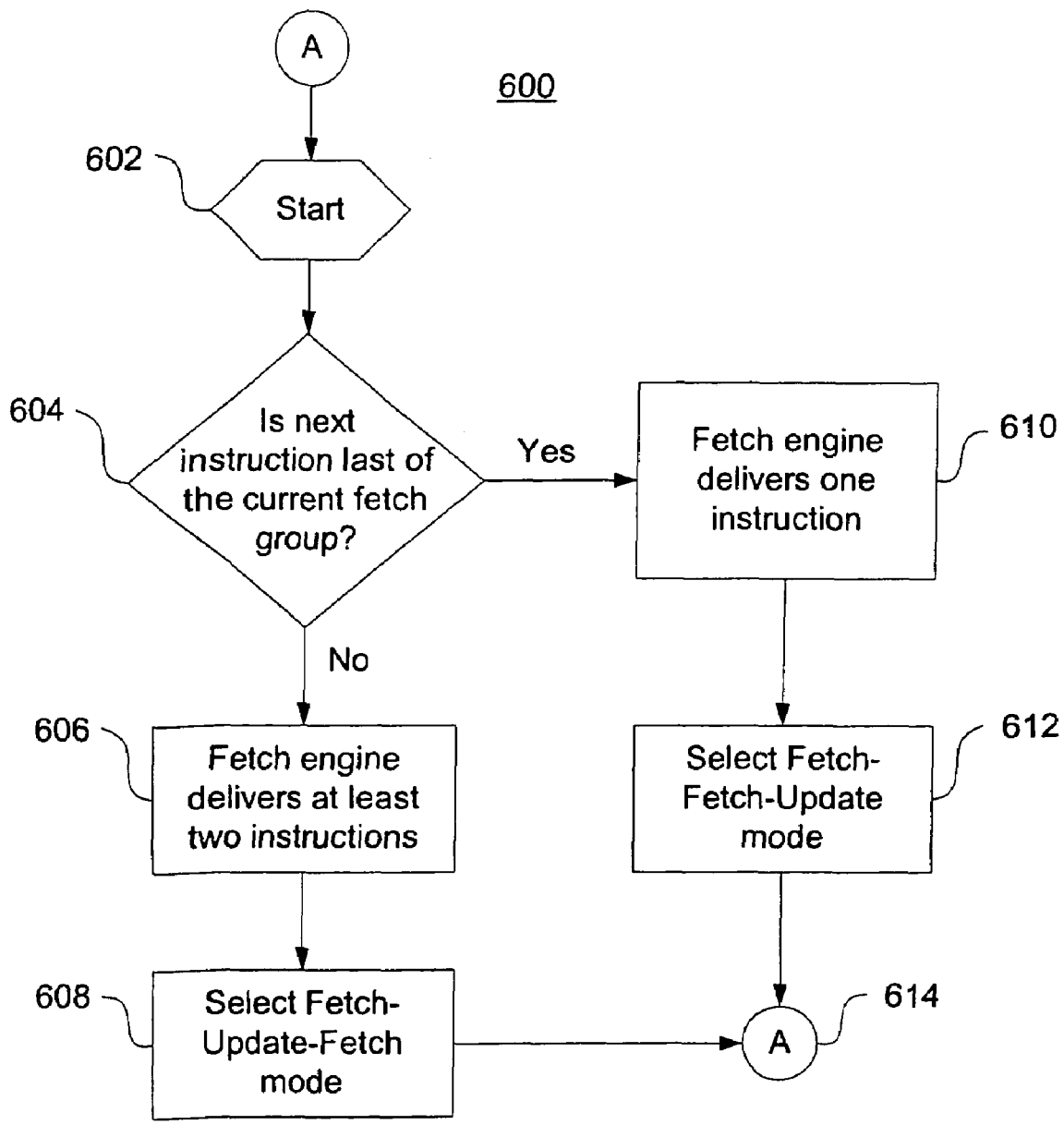
FIG. 6 is a flow chart of a method in accordance with an embodiment of the present invention.

A flowchart 600 of an exemplary method in accordance with an embodiment of the invention is shown in FIG. 6. The start 602 as indicated in the flowchart 600 may represent any point in execution of code on the processor. In step 604, the fetch engine 104 determines whether the next instruction to be executed is the last instruction of the currently fetched group. If it is, then in step 610 the fetch engine 104 can deliver no more than one instruction to the processor. In this case, the Fetch-Fetch-Update 506 mode of operation is selected at step 612. Thus, the BHT 108 would be updated only after these instructions or instruction groups are fetched. The process then returns to point A at step 614 in preparation for the next instruction.

Otherwise, if the next instruction to be executed is not the last instruction of the fetch group, the fetch engine 104 can deliver two or more instructions to the processor at step 606. In this case, the Fetch-Update-Fetch mode 504 of operation is selected at step 608. In this case, the BHT 108 would be updated after a single instruction or instruction group is fetched. The process then returns to point A at step 614 in preparation for the next instruction.

In the table 700 shown in FIG. 7, a two-bit implementation of BHT update mode selections is depicted in accordance with one aspect of the present invention. In this embodiment, a memory address, referred to as the branch redirection address("R_ADDR"), as given by column 702, contains two binary bits, e.g., the two least significant address bits. The pair of bits can be '00', '01', '10' or '11', as represented by rows 710, 712, 714 and 716, respectively. In a preferred embodiment, the two binary bits also represent an offset into the current fetch group of instructions. In this exemplary case, each fetch group may hold up to four instructions. In practice and in accordance with the present invention, fetch groups holding any number of instructions may be employed.

Again referring to FIG. 7, when the branch redirection address or offset is '00', meaning an offset of 0 instructions into the current fetch group, following along row 710 of the table 700 indicates that the number of instructions in the current fetch group that the fetch engine 104 can deliver, as indicated in column 704, is four (i.e., instructions located at memory addresses 00, 01, 10 and 11). Continuing along row 710, the BHT update mode column 706 indicates that the Fetch-Update-Fetch mode 504 is selected for the BHT 108.

In the exemplary case, a similar selection is made for branch redirection offsets '01' and '10', given by rows 712 and 714, and corresponding to offsets into the current fetch group of 1 and 2 instructions, respectively. For the '01' case, the fetch engine 104 can deliver three instructions (i.e., instructions located at memory addresses 01, 10 and 11). For the '10' case, the fetch engine 104 can deliver two instructions (i.e., instructions located at memory addresses 10 and 11).

When the branch redirection address in this example is '11', given by row 716 and corresponding to an offset into the current fetch group of 3, the number of instructions that the fetch engine 104 can deliver is then only one (i.e., the instruction at address 11), and so the Fetch-Fetch-Update mode 506 is selected for the BHT 108 such that two or more instructions are fetched prior to updating.

Figure 8A:
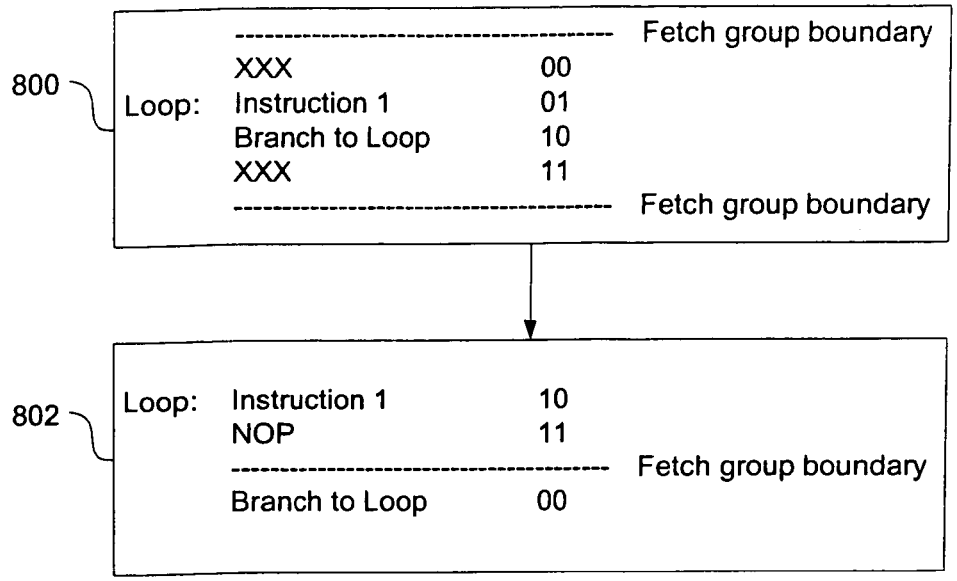
FIGS. 8(a)-(b) illustrate examples of compiler-assisted instruction handling in accordance with aspects of the present invention.
Figure 8B:
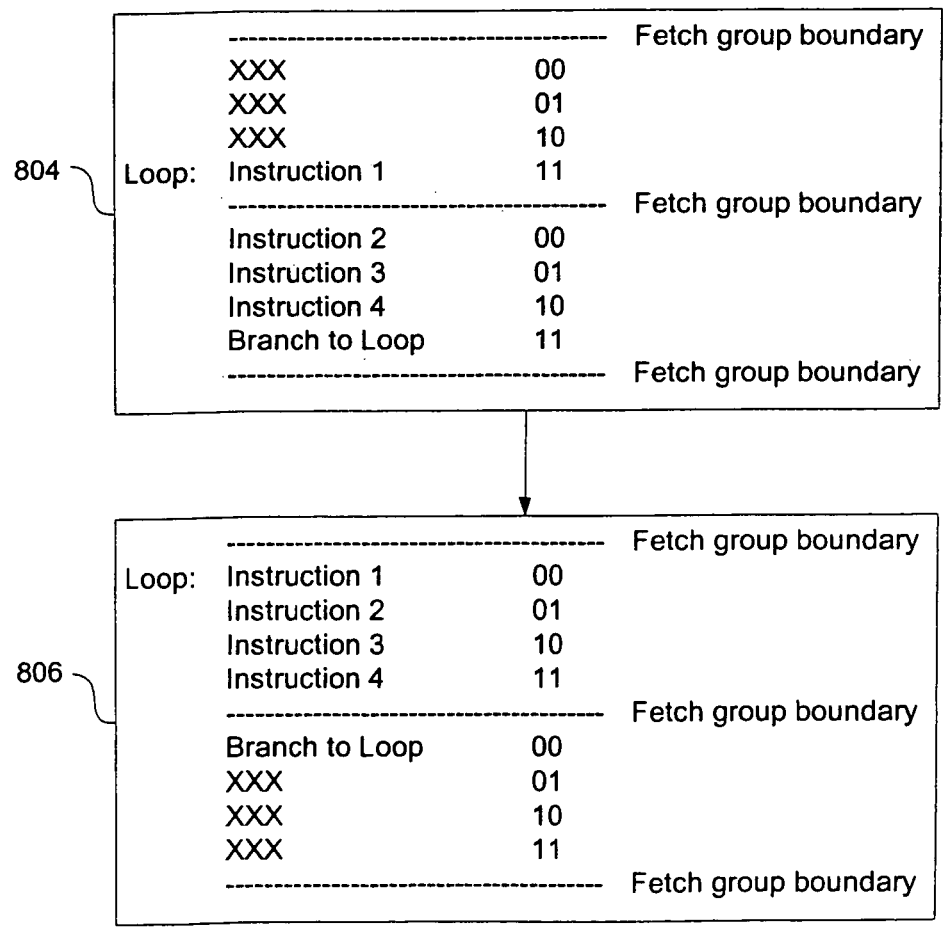

In accordance with another aspect of the invention, a compiler or other element can be used to assist overall performance of a BHT-based processor system by realigning instructions to be executed by the processor. The following examples illustrate, for exemplary purposes, a fetch group having up to four instructions and a two-bit branch redirection address. It should be understood that the invention can be employed with any number of instructions and is not limited to two-bit addressing. FIG. 8(*a*) illustrates a case when a loop occurs within one fetch group. FIG. 8(*b*) illustrates a case when a loop crosses a fetch group boundary and occurs within two fetch groups. The "LOOP:" label in these examples indicates the instruction address at which each loop iteration begins.

Referring to FIG. 8(*a*), a loop having two instructions is shown in box 800. The loop begins at Instruction 1, which has the two-bit address 01. The next instruction in the fetch group, "Branch to Loop," has the two-bit address 10. If branch misdirection occurs, it is desirable to update the BHT as well as to fetch instructions in order to execute the loop. It is preferable to fetch instructions before updating the BHT. While either the Fetch-Update-Fetch or Fetch-Fetch-Update modes 504, 506 could be selected, operating in the Fetch-Update-Fetch mode 504 is more desirable because the BHT can be updated before refetching a "branch to loop" instruction. Therefore, in a preferred example, the loop is extended (or shifted) across two fetch groups. The change in the alignment of the instructions may include adding one or more instructions, such as NOP instructions, as (or if) needed.

Thus, as seen in box 802, the loop still begins at Instruction 1, which has been realigned to be within a first fetch group at the two-bit address 10. In this example, an NOP instruction is inserted having the two-bit address 11, after Instruction 1. The NOP instruction in this case is the last instruction in the first fetch group. The "Branch to Loop" instruction is realigned to a second fetch group at the two-bit address 00. Because the loop begins at an address location other than 11, the Fetch-Update-Fetch mode 504 will be selected. Thus, the first fetch obtains Instruction 1 and the NOP instruction. Then the BHT is updated. Finally, the second fetch obtains the Branch to Loop instruction, which will utilize the updated BHT information.

Referring to FIG. 8(*b*), a loop spanning two fetch groups is shown in box 804. The loop begins in the first fetch group at Instruction 1, which has the two-bit address 11. The remaining instructions are within the second fetch group. If the instructions were not realigned, then the Fetch-Fetch-Update mode 506 would be selected based upon the address 11 of Instruction 1. However, as indicated above, it is more desirable to operate in the Fetch-Update-Fetch mode 504. Therefore, the instructions are preferably realigned in the loop so that the Fetch-Update-Fetch mode 504 is selected. This can be done by realigning the instructions within the fetch groups. Thus, as shown in box 806, Instructions 1-4 can be placed in the first fetch group and the Branch to Loop instruction can remain in the second fetch group. Now, because the loop begins at an address other than 11, the Fetch-Update-Fetch mode 504 is selected. Thus, the first fetch obtains Instructions 1-4. Then the BHT is updated. Finally, the second fetch obtains the Branch to Loop instruction, which will utilize the updated BHT information.

For situations where the loop spans three or more fetch groups, even if the loop begins with an instruction having the two-bit address 11, it is not necessary to realign the instructions. This is the case because even in the Fetch-Fetch-Update mode 506, the BHT will be updated before the Branch to Loop instruction is performed.

The foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:

1. A method of updating a branch history table to assist in processing branch instructions by a processor employing an instruction pipeline that holds a plurality of instructions, comprising:

(a) determining a number of instructions to be fetched;

(b) selecting a first mode to update the branch history table when there are at least two instructions to be fetched; and (c) selecting a second mode to update the branch history table when there are less than two instructions to be fetched;

wherein, upon a branch misdirection, the method further comprises:

fetching at least two instructions into the instruction pipeline to be executed, then updating the branch history table, and then fetching one or more additional instructions into the instruction pipeline to be executed upon selecting the first mode; and fetching a first instruction into the instruction pipeline to be executed, then fetching another instruction into the instruction pipeline to be executed, and then updating the branch history table upon selecting the second mode.

2. The method according to claim 1, wherein at least some of the plurality of instructions are stored in a memory and selected ones of the instructions are fetched from the memory.

3. The method according to claim 1, wherein determining the number of instructions comprises examining a value associated with an address location of the instructions.

4. The method according to claim 3, wherein the value is contained in a register.

5. The method according to claim 3, wherein the value is located at an address in a memory.

6. The method according to claim 3, wherein the value is a one-bit binary value, the method further comprising:
determining that there is one instruction awaiting execution when the binary value is a first number; and
determining that there are two or more instructions awaiting execution when the binary value is a second number.

7. The method according to claim 3, wherein the value is a two-bit binary value, the method further comprising:
determining that there is one instruction awaiting execution when the binary value is a first number; and
determining that two or more instructions are awaiting execution when the binary value is not the first number.

8. The method according to claim 3, wherein the value is a binary value having more than two bits, the method further comprising:
determining that one instruction can be delivered when the binary value satisfies a first condition; and
determining that two or more instructions can be delivered when the binary value satisfies a second condition.

9. The method according to claim 3, wherein the value is an instruction offset associated with a fetch group.

10. The method according to claim 1, wherein the method is performed if the branch history table incorrectly predicts whether a branch instruction would or would not be taken.

11. A method of operating a processor employing an instruction cache, a branch history table, and a fetch engine for fetching instructions, the branch history table having a selectable update mode, comprising:
(a) examining a value associated with a current branch redirection address of the fetch engine;
(b) determining if at least two of the instructions can be delivered by the fetch engine and selecting a first mode for the branch history table when the value satisfies a first condition; and
(c) determining if less than two instructions can be delivered by the fetch engine and selecting a second mode for the branch history table when the value satisfies a second condition;
wherein, upon a branch misdirection, the method further comprises:
fetching at least two instructions into the instruction pipeline to be executed, then updating the branch history table, and then fetching one or more additional instructions into the instruction pipeline to be executed upon selecting the first mode; and
fetching a first instruction into the instruction pipeline to be executed, then fetching another instruction into the instruction pipeline to be executed, and then updating the branch history table upon selecting the second mode.

12. The method according to claim 11, wherein at least some of the instructions are stored in a memory and selected ones of the instructions are fetched from the memory.

13. A processor, comprising:
an instruction pipeline; and
a branch history table capable of managing a program containing instructions that can be executed by the processor;
wherein if the branch history table incorrectly predicts whether a conditional branch instruction should be taken, a first mode of operation is selected if the instruction pipeline has at least two instructions that can be executed by the processor, and a second mode of operation is selected if the instruction pipeline has less than two instructions that can be executed by the processor;
wherein the processor fetches at least two instructions into the instruction pipeline to be executed, then updates the branch history table, and then fetches one or more additional instructions into the instruction pipeline to be executed upon selecting the first mode; and
the processor fetches a first instruction into the instruction pipeline to be executed, then fetches another instruction into the instruction pipeline to be executed, and then updates the branch history table upon selecting the second mode.

14. A recording medium recorded with a computer program for use by a processor having an instruction pipeline and using a branch history table (BHT) to assist in processing instructions, the BHT having a selectable update mode, the computer program comprising:
(a) determining the number of instructions in the instruction pipeline that can be executed by the processor;
(b) selecting a first mode of operation to fetch at least some of the instructions and update the BHT when there are at least two instructions in the instruction pipeline that can be executed by the processor; and
(c) selecting a second mode of operation to fetch at least some of the instructions and update the BHT when there are less than two instructions in the instruction pipeline that can be executed by the processor;
wherein, upon a branch misdirection, the computer program further comprises:
fetching at least two instructions into the instruction pipeline to be executed, then updating the branch history table, and then fetching one or more additional instructions into the instruction pipeline to be executed upon selecting the first mode; and
fetching a first instruction into the instruction pipeline to be executed, then fetching another instruction into the instruction pipeline to be executed, and then updating the branch history table upon selecting the second mode.

15. The recording medium according to claim 14, wherein at least some of the instructions are stored in a memory and selected ones of the instructions are fetched from the memory.

16. The recording medium according to claim 14, wherein determining the number of instructions in the pipeline that can be executed by the processor is performed by examining a binary value.

17. The recording medium according to claim 16, wherein the binary value is either a one-bit binary value or a two-bit binary value.

18. A method of updating a branch history table, comprising:
determining a number of instructions ready for delivery to a processor;
selecting a first mode for updating the branch history table when the number of determined instructions exceeds a minimum value;
selecting a second mode for updating the branch history table when the number of determined instructions does not exceed the minimum value; and
updating the branch history table according to the first mode or the second mode;
wherein the first mode is selected if there are at least two instructions for processing by the processor, and the second mode is selected if there are less than two instructions for processing by the processor; and wherein, upon a branch misdirection, the method further comprises:

fetching at least two instructions into the instruction pipeline to be executed, then updating the branch history table, and then fetching one or more additional instructions into the instruction pipeline to be executed upon selecting the first mode; and fetching a first instruction into the instruction pipeline to be executed, then fetching another instruction into the instruction pipeline to be executed, and then updating the branch history table upon selecting the second mode.

19. A processing system for processing operations, comprising:

a plurality of processing devices operable to execute instructions using a branch history table, a first one of the processing devices comprising a processing element, a processing unit or a sub-processing unit;

wherein if the branch history table incorrectly predicts whether a conditional branch instruction should be processed, a first mode of operation is selected for execution by the first processing device if at least two instructions are available for the first processing device, and a second mode is selected for execution by the first processing device if less than two instructions are available for the first processing device;

wherein, upon branch misdirection, the first processing device:

fetches at least two instructions into the instruction pipeline to be executed, then updates the branch history table, and then fetches one or more additional instructions into the instruction pipeline to be executed upon selecting the first mode; and fetches a first instruction into the instruction pipeline to be executed, then fetches another instruction into the instruction pipeline to be executed, and then updates the branch history table upon selecting the second mode.

20. The processing system of claim 19, wherein the first processing device comprises a processing element including the branch history table.

21. The processing system of claim 20, wherein the processing element further includes a fetch engine connected to the branch history table.

22. The processing system of claim 20, wherein a second one of the processing devices comprises a processing unit that is part of the processing element.

23. The processing system of claim 22, wherein the processing unit includes the branch history table.

24. The processing system of claim 23, wherein the processing unit further includes a fetch engine connected to the branch history table.

25. The processing system of claim 20, wherein a second one of the processing devices comprises a processing unit that is part of the processing element, and a third one of the processing devices comprises a sub-processing unit that is part of the processing element and is connected to the processing unit by a bus.

26. The processing system of claim 25, wherein the sub-processing unit includes the branch history table.

27. The processing system of claim 26, wherein the sub-processing unit further includes a fetch engine connected to the branch history table.

28. The processing system of claim 19, wherein:

a second one of the processing devices comprises a processing unit;

the first processing device comprises a first sub-processing unit; and at least a third one of the processing devices comprises a second sub-processing unit, the first and second sub-processing units being connected to the processing unit by a bus, and at least the first sub-processing unit being connected to a memory and being operable to execute instructions using the branch history table.

29. The processing system of claim 28, wherein:

the first sub-processing unit fetches the at least two instructions for execution, then updates the branch history table, and then fetches the one or more additional instructions for execution upon selecting the first mode; and the first sub-processing unit fetches the first instruction for execution, then fetches the another instruction for execution, and then updates the branch history table upon selecting the second mode.

30. The processing system of claim 19, further comprising a memory for storing instructions available to the processing devices.

31. The processing system of claim 30, wherein the memory is integrally provided with the processing devices.

* * * * *